United States Patent
Jang

(10) Patent No.: US 9,473,998 B2
(45) Date of Patent: *Oct. 18, 2016

(54) METHOD AND APPARATUS TO POSTPONE UE FROM HANDOVER TO AN OVERLOADED RADIO NETWORK FROM ANOTHER RADIO NETWORK

(71) Applicant: TELEFONAKTIEBOLAGET L M ERICSSON (PUBL), Stockholm (SE)

(72) Inventor: Ke-Chi Jang, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,330

(22) Filed: Apr. 14, 2016

(65) Prior Publication Data

US 2016/0234745 A1  Aug. 11, 2016

Related U.S. Application Data

(63) Continuation of application No. 14/789,229, filed on Jul. 1, 2015, now Pat. No. 9,332,472, which is a continuation of application No. 13/721,322, filed on Dec. 20, 2012, now Pat. No. 9,094,886.

(60) Provisional application No. 61/679,893, filed on Aug. 6, 2012.

(51) Int. Cl.
*H04W 36/00* (2009.01)
*H04W 36/22* (2009.01)
(Continued)

(52) U.S. Cl.
CPC ......... *H04W 36/22* (2013.01); *H04W 36/0083* (2013.01); *H04W 48/06* (2013.01); *H04W 36/0022* (2013.01); *H04W 48/18* (2013.01)

(58) Field of Classification Search
USPC .......................... 455/436, 522, 450; 370/331
See application file for complete search history.

(56) References Cited

U.S. PATENT DOCUMENTS 7,991,404 B2 *  8/2011  Kagimoto ............. H04W 28/02
                                                455/436
8,897,802 B2    11/2014  Meredith et al.
(Continued)

FOREIGN PATENT DOCUMENTS

| WO | 2011086528 A2 | 7/2011 |
| WO | 2011109027 A1 | 9/2011 |
| WO | 2012092071 A1 | 7/2012 |

OTHER PUBLICATIONS

Ericsson, et al., Handling of Congestion for e1xCSFB; 3GPP Draft, R2-096712; Nov. 13, 2009.
(Continued)

*Primary Examiner* — David Q Nguyen

(57) ABSTRACT

A node of a secondary RAT that is in communication with a primary node of a primary RAT and UEs that are able to communicate by way of the primary and secondary RATs. The node includes a network interface unit of the node which receives a message from the primary node that indicates that the primary RAT is in an overload condition. The node includes a processing unit of the node which forms UE messages for the UEs not to try to communicate with the primary RAT, the network interface unit of the node sending the messages to the UEs. A method of a node of a secondary RAT that is in communication with a primary node of a primary RAT and UEs that are able to communicate by way of the primary and secondary RATs.

9 Claims, 3 Drawing Sheets

(51) Int. Cl.
*H04W 48/06* (2009.01)
*H04W 48/18* (2009.01)

(56) References Cited

U.S. PATENT DOCUMENTS

| | | | |
|---|---|---|---|
| 8,971,902 B2* | 3/2015 | Miki | H04J 13/00 455/450 |
| 9,332,472 B2* | 5/2016 | Jang | H04W 36/22 |
| 2010/0273485 A1 | 10/2010 | Huang et al. | |
| 2011/0014940 A1* | 1/2011 | Zhang | H04W 52/146 455/522 |
| 2011/0058480 A1 | 3/2011 | Dahlen | |
| 2011/0143758 A1* | 6/2011 | Bae | H04W 36/0055 455/436 |
| 2011/0305220 A1* | 12/2011 | Lindoff | H04W 28/26 370/331 |
| 2012/0064896 A1 | 3/2012 | Guo et al. | |
| 2012/0087330 A1 | 4/2012 | Zhu et al. | |
| 2012/0170503 A1 | 7/2012 | Kelley et al. | |
| 2013/0051325 A1 | 2/2013 | Ryu et al. | |
| 2013/0215742 A1 | 8/2013 | Sirotkin et al. | |
| 2013/0337814 A1 | 12/2013 | Wong et al. | |
| 2014/0056134 A1 | 2/2014 | Koskinen et al. | |
| 2014/0099969 A1 | 4/2014 | Hwang et al. | |

OTHER PUBLICATIONS

Motorola, et al., Congestion Control for Enhanced 1xCS Fallback; 3GPP Draft; R2-101298; Feb. 16, 2010.

3GPP TSG RAN WG3 Meeting #68, Transfer of carrier information between UTRAN and E-UTRAN, Alcatel-Lucent, R3-101631, Montreal, Canada, May 10-14, 2010.

3GPP TSG-RAN WG3#66bis, Mobility Load Balancing using redirection function, NTT DOCOMO, Inc., R3-100051, Valencia, Spain, Jan. 18-22, 2010.

* cited by examiner

METHOD AND APPARATUS TO POSTPONE UE FROM HANDOVER TO AN OVERLOADED RADIO NETWORK FROM ANOTHER RADIO NETWORK

CROSS-REFERENCE TO RELATED APPLICATIONS

This application is a continuation of U.S. patent application Ser. No. 14/789,229, filed Jul. 1, 2015, which is a continuation of U.S. patent application Ser. No. 13/721,322, filed Dec. 20, 2012, now U.S. Pat. No. 9,094,886, which claims the benefit of U.S. Provisional Patent Application No. 61/679,893 filed Aug. 6, 2012, the contents of which are incorporated herein by reference.

TECHNICAL FIELD

The present invention is related to postponing a UE from handover to an overloaded radio network from another radio network. (As used herein, references to the "present invention" or "invention" relate to exemplary embodiments and not necessarily to every embodiment encompassed by the appended claims.) More specifically the present invention pertains to postponing a UE from handover to an overloaded radio network from another radio network by a node of the overloaded radio network sending a message regarding its overload condition to a node in the other radio network.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Due to the introduction of advanced wireless Radio Access Technologies (RAT), many mobile network operators are forced to deploy systems based on new technology to meet the consumer demands but still need to keep the legacy system for different reasons. Since different RATs may be based on different radio technology, the two RATs deployed by the operator may not be backward compatible. For this reason, inter-RATs mechanisms were developed to allow network to control multi-RATs supported UE switching between different RATs within operator's networks. The inter-RATs mechanism also provide requirements to guide UE to determine which RAT it should be camp on if multiple RATs are detected in the network.

Operators with multiple RATs supported in the network usually configure one of the RAT as the primary RAT. While UEs are in idle, the UEs are usually configured by the operator to search for primary RAT and camp on the primary RAT when possible.

UEs sometime may not camp on the primary RAT due to different reasons. For example, the UE was located in an area only secondary RAT service is provided, and just move into an area with services from both RATs are provided. Another possibility could be that the UE went to secondary RAT to access the network (i.e. with a dedicated channel) because it could not get reasonable channel strength form primary RAT when user is trying to access the network. Regardless how the UE end up camp on the secondary RAT, there are inter-RAT InterWorking (IWK) mechanisms exist to move the UE back to primary RAT when UE is in idle or even when UE has a dedicate channel assigned. Using LTE and eHRPD IWK as an example, two eHRPD (as secondary RAT) mechanisms exists that allows idle UE re-select the LTE (as primary RAT) as the RAT to camp on. The two mechanisms are either based on MMSS (Multi-Mode System Selection), which has minimum control from network, or Other RAT Neighbor List method, which allows network have better control on UE's RAT selection behavior. For UE accessing the eHRPD dedicated channel, the eAN can also use redirection mechanism to handover the UE to LTE system.

The existing inter-RAT mechanisms work well in normal condition with the assumption that the primary RAT (e.g. LTE) has greater capacity (e.g. allows more UEs attach to the network) compare to the secondary RAT (e.g. legacy system such as HRPD). When overload on primary RAT occurs, the existing inter-RAT mechanisms can also redirect the UE to the secondary RAT to address the overload situation on the primary RAT.

Since inter-RAT functions works both ways. When the UEs are redirected to the secondary RAT due to overload situation on primary RAT, the inter-RAT IWK function on secondary RAT also kick in and attempt to redirect the UE back to the primary RAT since the system is configured primary RAT as the default camp on system for these UE. Since secondary RAT has no knowledge of primary RAT's load condition, UEs may ping-ponging between two RATs and drastically reduce the network efficiency.

BRIEF SUMMARY OF THE INVENTION

The present invention pertains to a node of a secondary RAT that is in communication with a primary node of a primary RAT and UEs that are able to communicate by way of the primary and secondary RATs. The node comprises a network interface unit of the node which receives a message from the primary node that indicates that the primary RAT is in an overload condition. The node comprises a processing unit of the node which forms UE messages for the UEs not to try to communicate with the primary RAT, the network interface unit of the node sending the messages to the UEs.

The present invention pertains to a method of a node of a secondary RAT that is in communication with a primary node of a primary RAT and UEs that are able to communicate by way of the primary and secondary RATs. The method comprises the steps of receiving at a network interface unit of the node a message from the primary node that indicates that the primary RAT is in an overload condition. There is the step of forming with a processing unit of the node UE messages for the UEs not to try to communicate with the primary RAT. There is the step of sending the messages through the network interface unit of the node to the UEs.

BRIEF DESCRIPTION OF THE DRAWING

In the accompanying drawings, the preferred embodiment of the invention and preferred methods of practicing the invention are illustrated in which.

DETAILED DESCRIPTION

Figure 1:
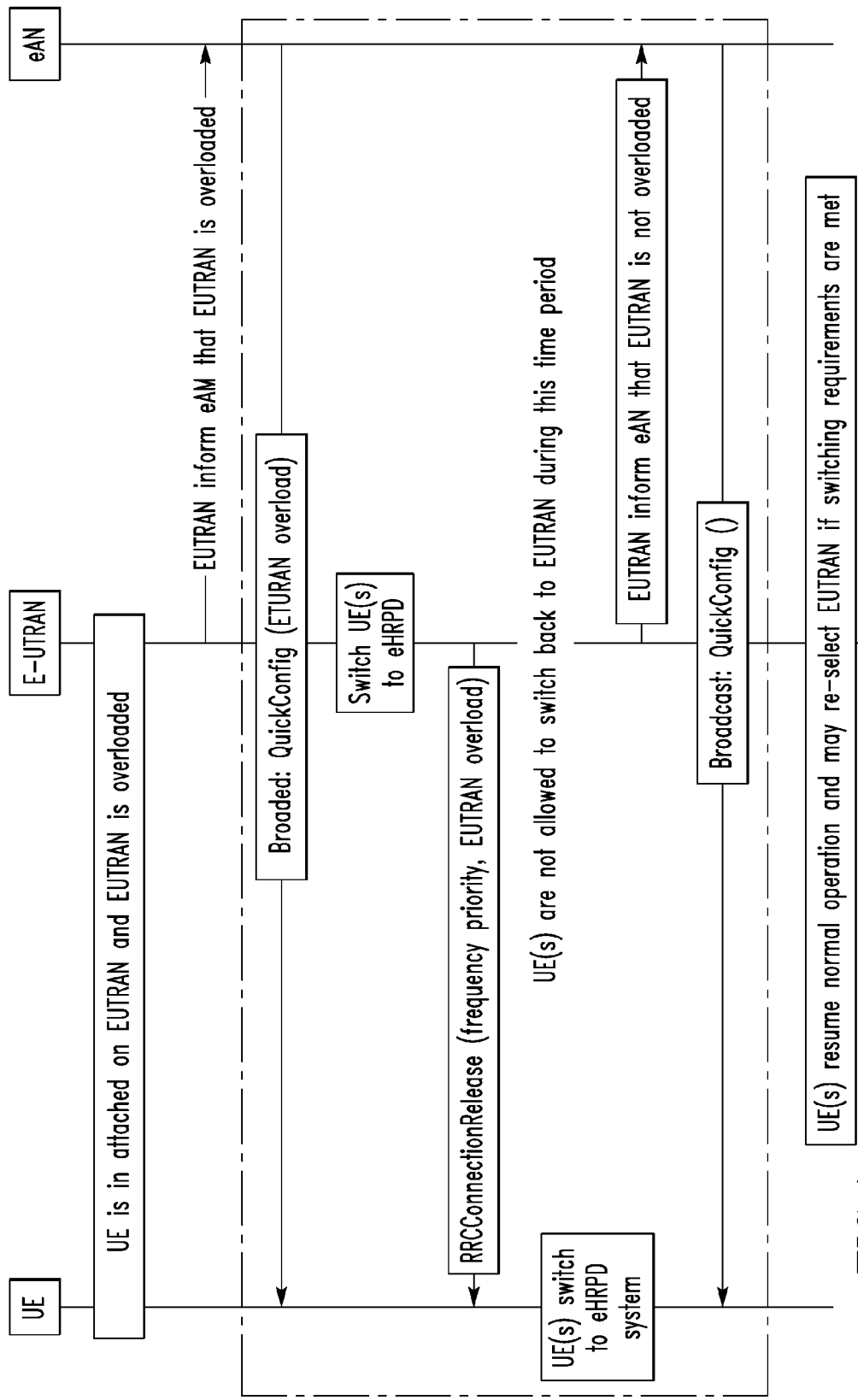
FIG. 1 shows an example based on example embodiment 1.
Figure 2:
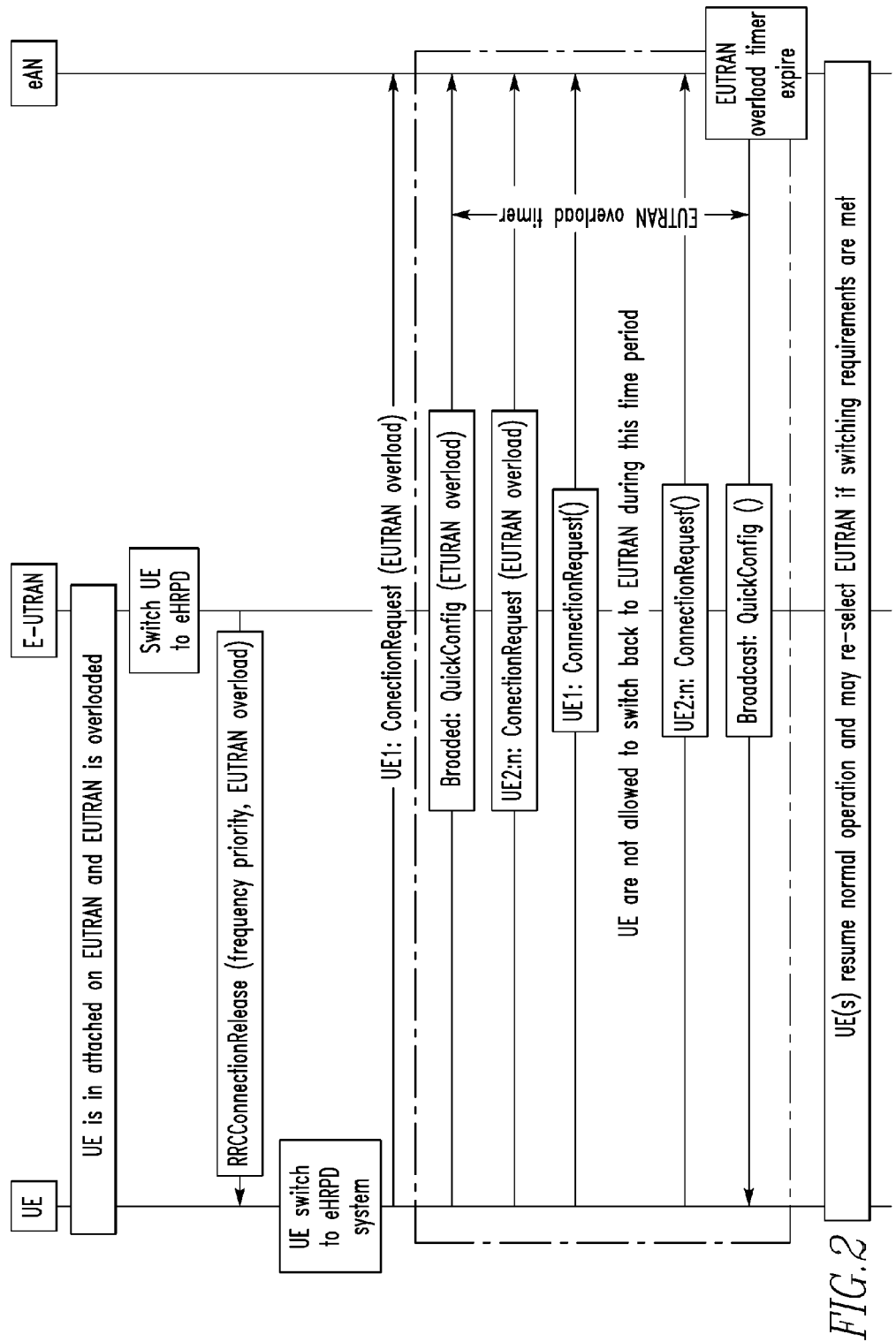
FIG. 2 shows an example based on example embodiment 2.
Figure 3:
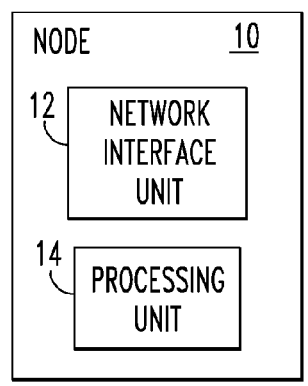
FIG. 3 is a schematic representation of the present invention.
Figure 4:
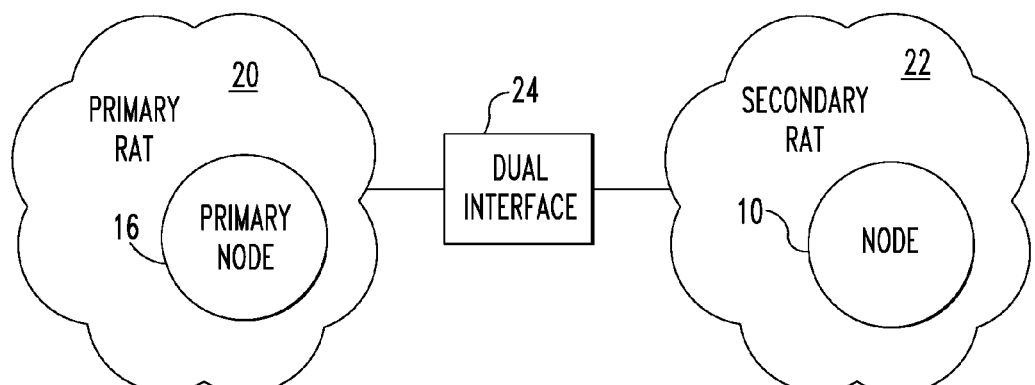
FIG. 4 is a block diagram of a node of the present invention.

Referring now to the drawings wherein like reference numerals refer to similar or identical parts throughout the several views, and more specifically to FIGS. 3 and 4 thereof, there is shown a node 10 of a secondary RAT 22 that is in communication with a primary node 16 of a primary RAT 20 and UEs that are able to communicate by way of the primary and secondary RATs 22. The node 10 comprises a network interface unit 12 of the node 10 which receives a message from the primary node 16 that indicates that the primary RAT 20 is in an overload condition. The node 10 comprises a processing unit 14 of the node 10 which forms UE messages for the UEs not to try to communicate with the primary RAT 20, the network interface unit 12 of the node 10 sending the messages to the UEs.

A broadcast message may be sent from the network interface unit 12 to the UEs with an indication that the primary RAT 20 is in the overload condition and each UE is not to switch back to the primary RAT 20. The network interface unit 12 may receive from a UE of the UEs an uplink message that the primary RAT 20 is in an overload condition. The broadcast message may affect an Other RAT Neighbor List Function in each UE so that each UE does not switch back to the primary RAT 20. The network interface unit 12 may stop sending the indication that the primary RAT is in the overload condition in the broadcast message from the network interface unit 12 of the node 10 after the network interface unit 12 has not received the uplink message for a predetermined time from any of the UEs that the primary RAT 20 is overloaded.

The network interface unit 12 may receive from a dual interface 24 in communication with the primary and the secondary RATs 22 that the primary RAT 20 is in the overload condition. The network interface unit 12 of the node 10 may receive an overload-off indication from the dual interface 24 when the overload condition of the primary RAT 20 has ended, and the processing unit 14 of the node 10 stops sending broadcast messages to the UEs that the primary RAT 20 is in the overload condition.

The present invention pertains to a method of a node 10 of a secondary RAT 22 that is in communication with a primary node 16 of a primary RAT 20 and UEs that are able to communicate by way of the primary and secondary RATs 20, 22. The method comprises the steps of receiving at a network interface unit 12 of the node 10 a message from the primary node 16 that indicates that the primary RAT 20 is in an overload condition. There is the step of forming with a processing unit 14 of the node 10 UE messages for the UEs not to try to communicate with the primary RAT 20. There is the step of sending the messages through the network interface unit 12 of the node 10 to the UEs.

The sending step may include the step of sending a broadcast message to the UEs with an indication that the primary RAT 20 is in the overload condition and each UE is not to switch back to the primary RAT 20. The receiving step may include the step of receiving from a UE of the UEs an uplink message that the primary RAT 20 is in an overload condition. The sending step may include the step of the broadcast message affecting an Other RAT Neighbor List Function in each UE so that each UE does not switch back to the primary RAT 20. There may be the step of stopping sending the indication that the primary RAT is in the overload condition in the broadcast message from the network interface unit 12 of the node 10 after the network interface unit 12 has not received the uplink message for a predetermined time from any of the UEs that the primary RAT 20 is overloaded.

The receiving step may include the step of receiving from a dual interface 24 in communication with the primary and the secondary RATs 20, 22 that the primary RAT 20 is in the overload condition. There may be the steps of the network interface unit 12 of the node 10 receiving an overload-off indication from the dual interface 24 when the overload condition of the primary RAT 20 has ended, and the processing unit 14 of the node 10 stopping sending broadcast messages to the UEs that the primary RAT 20 is in the overload condition.

In the operation of the invention, when a Primary RAT 20 is in overload condition and forced to redirect an UE to a secondary RAT 22, the Secondary RAT 22 needs to be informed about the overload situation of the Primary RAT 20. With this information, the Secondary RAT 22 can take appropriate action to reduce or avoid ping-pong effect due to making UEs return to the overloaded Primary RAT 20.

There are two possible ways to convey overload information from one RAT (e.g. Primary overloaded RAT) to another RAT (e.g. Secondary RAT 22):

UE assisted RAT system overload indication:
1. If the primary RAT 20 system is overloaded, and determined to redirect an UE to different RAT (secondary) system, the primary RAT's 20 downlink message that instruct the UE to redirect to secondary RAT 22 system contain primary RAT's 20 network overload indication. This network overload information can be an explicit "network overload" indication in the downlink message or can be implicit information. Using LTE as an example, after several failed attempt to redirect UE to different LTE frequencies, the corresponding downlink message (e.g., either release message or reject message or other appropriate downlink message) marked the priority of the Secondary RAT 22 as the highest priority (existing function). Making Secondary RAT 22 with highest priority compare to Primary RAT 20 (e.g. LTE) can be viewed by UE as a network overload.
2. UE reselect/redirect to Secondary RAT 22 due to the appropriate downlink message from Primary RAT 20 that cause the RAT reselect/redirect.
3. After successfully acquire Secondary RAT 22 system, the UE sends a Secondary RAT's 22 uplink message containing information indicates that the Primary RAT 20 is overloaded. The UE set the uplink message's Primary RAT 20 overload indication based on the explicit or implicit overload information obtained before switching to Secondary RAT 22. UE only include the Primary RAT 20 overloaded indication in the very first uplink message that is used to carry this kind of indication (message to be sent to secondary RAT 22) after switching over from primary RAT 20. While in the secondary RAT 22, if the same message is to be sent again for any reason, the UE does not include Primary RAT 20 overloaded indication any more in the subsequence occurrence of this uplink message.
4. When the RAN (of Secondary RAT 22 system) receives UE uplink message indicates that Primary RAT 20 system is overloaded, the RAN takes action to inform UEs not to switch (e.g. handover) to Primary RAT 20 system. There are different ways of doing this function listed as follows:
RAN can use broadcast message to broadcast Primary RAT 20 system overload. As long as this overload indication is set in the broadcast message, the UE does not attempt to switch back to Primary RAT 20 (e.g. using MMSS or any "Other Inter-RAT mechanisms").

Beside broadcast Primary RAT 20 system overload information in the broadcast message, if Other RAT Neighbor List function is implemented, the RAN can also stop this function or modify the function appropriately (e.g. change the priority of channels, etc.) during the Primary RAT 20 overload period.

5. RAN of the Secondary RAT 22 system continues to broadcast Primary RAT 20 system overload information as long as it continues to receive uplink message from any UE that have the Primary RAT 20 system overload indicator set.
6. UEs supports both RAT systems do not attempt to switch back (e.g. handover or redirect) to primary RAT 20 system (e.g. even though the switching requirements are met based on implemented RAT system selection function(s)) as long as secondary RAT 22 broadcast "Primary RAT overloaded" indication.
7. RAN of the Secondary RAT 22 system may stop broadcast the Primary RAT 20 system overload information if the RAN does not receive any UE indicating Primary RAN system overload in x minutes since last UE contains the overload information.
8. inter-RAT mechanisms resume normal function on both UE and RAN sides after RAN of the Secondary RAT 22 system stop broadcast Primary RAT 20 system overload information.

Network based RAT system overload indication:
1. The Radio Resource Management (RRM) function of the primary RAT 20 system (or any network entity manage the network overload condition) inform the RRM function of the secondary RAT 22 system that the primary RAT 20 system is overloaded. This information can be passed from primary RAT 20 system to secondary RAT 22 system through interface connected to both systems.
2. After the secondary RAT 22 system receives the overload indication from primary RAT 20 system, the secondary system RAN perform step 4 of "UE assisted" method above. The only difference is that instead of getting the overload indication from UE, the overload indication is coming from the primary RAT 20 system through interface connecting to both systems.
3. RAN of the secondary RAT 22 system continues to broadcast Primary RAT 20 system overload indication as long as it continues to receive overload indication from primary RAT 20 system or the secondary RAT 22 system does not receive "overload-off" indication from primary RAT 20 system (i.e. the primary RAT 20 system may only sends overload indication once instead of continuously pass this information to secondary RAT 22 system).
4. UEs supports both RAT systems do not attempt to switch back (e.g. handover or redirect) to primary RAT 20 system (e.g. even though the switching requirements are met based on implemented RAT system selection function(s)) as long as secondary RAT 22 broadcast "Primary RAT overloaded" indication.
5. When primary RAT 20 system overload condition diminished, the primary RAT 20 system sends "overload-off" indication to secondary RAT 22 system. Upon receiving this "overload-off" indication, the RAN of the secondary RAT 22 system may stop broadcast the primary RAT 20 system overload indication.
6. inter-RAT mechanisms resume normal function on both UE and RAN sides after RAN of the Secondary RAT 22 system stop broadcast Primary RAT 20 system overload information.

Even though the methods mentioned above using "primary" and "secondary" to identify the different RAT systems, but the system can also be viewed as "source" and "target" systems where the "secondary" system is identified as the "target" system.

Even though the methods mentioned above using "primary" and "secondary" to identify the different RAT systems, but the system can also be viewed as "source" and "target" systems where the "secondary" system is identified as the "target" system. If "source" and "target" is used, the invention can be viewed as how to prevent UE switching back to overloaded "source" system.

The concept of the invention provided above can be applicable from any RAT system to another RAT system. For description purpose, EUTRAN and eHRPD IWK are used for example purpose where EUTRAN is identified as the primary RAT 20 system and eHRPD is identified as secondary RAT 22 system:

EUTRAN overloaded; UE assisted method:
When EUTRAN is overloaded, it may start reject or release (e.g. RRCConnectionReject or RRCConnectionRelease) UEs from EUTRAN frequencies and de-prioritize some of the EUTRAN frequencies. When all available EUTRAN frequencies are overloaded, the EUTRAN start reject or release some of the UEs and, in the message, inform UE to redirect/reselect eHRPD system.
 eNB may include "EUTRAN overloaded" indicator when the message is used to re-direct the UE to eHRPD (preferred); or
 the release/reject message make cdma frequency as the highest priority. Under this situation, UE set "EUTRAN overload" indicator.
When UE moved to eHRPD, the UE sends an HRPD signalling message (e.g. ConnectionRequest message or RouteUpdate message) to include "EUTRAN overloaded" indication. The UE only include the "EUTRAN overloaded" indication once right after switching to eHRPD from EUTRAN. For example, if ConnectionRequest message is used to carry the EUTRAN overloaded" indication, the UE only include this indication in the first ConnectionRequest message UE send after it switches from EUTRAN to eHRPD. UE does not include this indication in any subsequent ConnectionRequest message as long as it is staying in the eHRPD system.
eHRPDeAN receive the uplink message with "EUTRAN overloaded" indication set. Then, eAN marked broadcast message (e.g. QuickConfigmessage) with "EUTRAN overloaded" indication set. If eAN also broadcast OtherRATNeighbour List message, the eAN can either stop broadcast the message or adjust the content of the message such that the UE will not use the information included in the message to perform idle handover back to EUTRAN. The eAN also initiate and starts the overload timer. The overload timer is defined as a period of x minutes (the length of x is defined by operator). The timer is reset is eAN receive at least one UE with "EUTRAN overloaded" indication before timer expires.
When UEs receive eAN broadcast message indicating "EUTRAN overloaded", the UEs temporally disable using PRL/MISS function (or any other system reselection function) to switch back to EUTRAN. If the OtherRATNeighbour List message is broadcasted by eAN, the UE follow the guideline provided in the message to determine whether it should switch back to EUTRAN.

UE switch from LTE to eHRPD will not set "EUTRAN overloaded" indication in uplink message (e.g. ConnectionRequest message) if the switching is not triggered due to LTE overload situation.

eAN continues to mark "EUTRAN overloaded" in the broadcast message if overload timer is not expired. When overload timer expired, the eAN stop broadcasting "EUTRAN overloaded" indication in the overhead message. If OtherRAT Neighbor list message is supported, the message is transmitted with normal parameters.

UEs detect that eAN remove the "EUTRAN overloaded" indication, the UEs can start using normal operation and perform EUTRAN reselection when appropriate.

EUTRAN overloaded; network based indication method:

When EUTRAN is overloaded, it may start reject or release (e.g. RRCConnectionReject or RRCConnectionRelease) UEs from EUTRAN frequencies and de-prioritize some of the EUTRAN frequencies. When all available EUTRAN frequencies are overloaded, the EUTRAN start reject or release some of the UEs. For the co-located networks (LTE/CDMA) or connected inter-RAT networks, a "EUTRAN overloaded" indication is passed from LTE RRM component to cdma RRM component. The interface used can be a proprietary interface, or a standards defined interface.

Upon receiving the "EUTRAN overloaded" indication from LTE network, the eHRPDeAN marked broadcast message (e.g. QuickConfig message) with "EUTRAN overloaded" indication. If eAN also broadcast OtherRATNeighbour List message, the eAN can either stop broadcast the message or adjust the content of the message such that the UE will not use the information included in the message to perform idle handover back to EUTRAN.

When UEs receive eAN broadcast message indicating "EUTRAN overloaded", the UEs temporally disable using PRL/MMSS function (or any other system reselection function) to switch back to EUTRAN. If the OtherRATNeighbour List message is broadcasted by eAN, the UE follow the guideline provided in the message to determine whether it should switch back to EUTRAN.

When LTE network overload condition diminished, the LTE network pass the "LTE not overload" indication to HRPD network. Upon receiving this indication, the eAN stop broadcasting "EUTRAN overloaded" indication in the overhead message. If OtherRAT Neighbor list message is supported, the message is transmitted with normal parameters.

UE detects that eAN remove the "EUTRAN overloaded" indication, the UE can start using normal operation and perform EUTRAN reselection when appropriate.

Example Embodiment 1

1. The LTE RRM sends "EUTRAN overloaded" indication to eHRPD
2. eHRPDeAN broadcast "EUTRAN overloaded" indication in the overhead message (e.g. QuickConfig). If OtherRATNeighborList message is also supported, eAN take action to stop sending the message (or other treatment to the message).
3. UE detect the "EUTRAN overloaded" indication from eAN, UE remain in eHRPD system and does not perform LTE re-selection mechanism (e.g. LTE reselection based on MMSS or other methods).
4. LTE RRM sends "EUTRAN not overload" indication to eHRPD
5. eHRPDeAN stop broadcast "EUTRAN overloaded" indication in the overhead message. If OtherRATNeighborList message is also supported, eAN resume OtherRATNeighborList message normal operation.
6. UE detect non-existence of "EUTRAN not overload" indication from eAN. UE resume normal operation and re-select and switch to LTE when switching requirements are met.

Example Embodiment 2

1. eNB sends RRCConnectionRelease message with redirection to eHRPD and includes "EUTRAN overloaded" indication.
2. Upon receiving the eNB downlink message, UE switch to eHRPD system. UE then sends ConnectionRequest message and include "EUTRAN overloaded" indication to eAN. The UE that switched from LTE to eHRPD system only include the "EUTRAN overloaded" indication in the first ConnectionRequest message send to eAN. As long as the UE remains in the eHRPD system, it does not include the indication in the subsequent ConnectionRequest messages.
3. Upon receiving first UE's uplink message (e.g. ConnectionRequest message) with "EUTRAN overloaded" indication, the eAN update the RRM and begin to send broadcast overhead message with "EUTRAN overloaded" indication. eAN (or RRM) initiate and starts LTE Overload timer.
4. UEs receives overhead message with "EUTRAN overloaded" temporally disable the LTE system re-selection function and does not attempt to switch to LTE system.
5. eAN has not detect any more UEs sends ConnectionRequest message with "ETURAN overloaded" indication and LTE Overload timer expires. eAN stop includes "EUTRAN overloaded" indication in the overhead message.
6. UE detect non-existence of "EUTRAN not overload" indication from eAN. UE resume normal operation and re-select and switch to LTE when switching requirements are met.

Example Embodiment 3

1. eNB sends RRCConnectionRelease message with redirection to eHRPD and includes "EUTRAN overloaded" indication.
2. Upon receiving the eNB downlink message, UE switch to eHRPD system. UE then sends ConnectionRequest message and include "EUTRAN overloaded" indication to eAN. The UE that switched from LTE to eHRPD system only include the "EUTRAN overloaded" indication in the first ConnectionRequest message send to eAN. As long as the UE remains in the eHRPD system, it does not include the indication in the subsequent ConnectionRequest messages.
3. Upon receiving first UE's uplink message (e.g. ConnectionRequest message) with "EUTRAN overloaded"

indication, the eAN update the RRM and begin to send broadcast overhead message with "EUTRAN overloaded" indication. eAN (or RRM) initiate and starts LTE Overload timer. eAN either stop broadcast OtherRATNeighborList message or modify the parameters in the OtherRATNeighborList message such that UE is not able to switch to LTE as long as it can acquire HRPD channels.

4. UEs receives overhead message with "EUTRAN overloaded" temporally disable the LTE system re-selection function and does not attempt to switch to LTE system.

5. eAN has not detect any more UEs sends ConnectionRequest message with "ETURAN overloaded" indication and LTE Overload timer expires. eAN stop includes "EUTRAN overloaded" indication in the overhead message. eAN also resume broadcasting OtherRATNeighborList message and using normal parameters for OtherRATNeighborList message.

6. UE detect non-existence of "EUTRAN not overload" indication from eAN. UE resume normal operation and re-select and switch to LTE when switching requirements are met.

The present invention provides mechanism to prevent UE switching back to the preferred (or primary/source) network from backup (or secondary/target) network when preferred (or primary/source) network is overloaded. The mechanism prevents UEs ping-ponging between two systems due to overload situation at the preferred network.

ABBREVIATIONS eAN: Enhanced Access Network
HRPD: High Rate Packet Data
LTE: Long Term Evolution
UE: User Equipment
E-UTRAN: Evolved UMTS Terrestrial Radio Access
RAT: Radio access technology
RRM: Radio Resource Management Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system comprising a node of target Radio Access Technology (RAT), a node of a source RAT, and further comprising one or more User Equipments (UEs) that are able to communicate with source and target RATs,
    wherein the node of the target RAT comprises:
        a network interface unit; and
        a processing unit, and
    wherein the node of the target RAT:
        receives, at the network interface unit, from a UE of the one or more UEs, an uplink message that the source RAT is in an overload condition;
        forms, with a processing unit of the node, a UE message for the one or more UEs not to try to communicate with the source RAT; and
        sends the UE message, through the network interface unit, to the one or more UEs.

2. The system of claim 1, wherein the target RAT is reselected by the UE of the one or more UEs based on information received in a downlink message from the source RAT.

3. The system of claim 2, wherein the information received in the downlink message from the source RAT indicates a source RAT overload condition.

4. The system of claim 3, wherein the information received in the downlink message indicating a source RAT overload condition, further comprises information that the target RAT is higher priority than the source RAT.

5. The system of claim 1, wherein the node of the target RAT receives the uplink message that the source RAT is in an overload condition, after the target RAT is reselected by the UE of the one or more UEs.

6. The system of claim 5, wherein the node of the target RAT receives the uplink message that the source RAT is in an overload condition, only in the first uplink message sent by the UE of the one or more UEs after reselecting the target RAT.

7. The system of claim 1, wherein sending the UE message further comprises the target node sending a broadcast message to the one or more UEs with an indication that the source RAT is in the overload condition.

8. The system of claim 7, wherein the broadcast message further indicates that each UE is not to switch back to the source RAT.

9. The system of claim 1, wherein the source RAT is Evolved UMTS Terrestrial Radio Access (E-UTRAN) and the target RAT is Enhanced Access Network (eAN).

* * * * *